United States Patent
Kwon et al.

(10) Patent No.: US 10,234,989 B2
(45) Date of Patent: Mar. 19, 2019

(54) TOUCH PANEL AND DISPLAY DEVICE INCLUDING THE SAME

(71) Applicants: Samsung Display Co., Ltd., Yongin-si (KR); UNIST(ULSAN NATIONAL INSTITUTE OF SCIENCE AND TECHNOLOGY), Ulsan (KR)

(72) Inventors: Jun Il Kwon, Yongin-si (KR); Franklin Bien, Ulsan (KR); Jae Joon Kim, Ulsan (KR); Sanghyun Heo, Ulsan (KR); Hyunggun Ma, Ulsan (KR); Kyungmin Na, Ulsan (KR)

(73) Assignees: Samsung Display Co., Ltd., Yongin-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 61 days.

(21) Appl. No.: 15/261,488

(22) Filed: Sep. 9, 2016

(65) Prior Publication Data
US 2017/0205954 A1 Jul. 20, 2017

(30) Foreign Application Priority Data
Jan. 18, 2016 (KR) .......................... 10-2016-0006067

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 2011/0248970 A1* | 10/2011 | Koyama | ............. | G02F 1/13452 345/204 |
| 2013/0207923 A1* | 8/2013 | Mohindra | ............... | G06F 3/044 345/174 |
| 2014/0043260 A1* | 2/2014 | Wang | ..................... | H05K 1/111 345/173 |

FOREIGN PATENT DOCUMENTS

JP 2010-231533 A 10/2010

OTHER PUBLICATIONS

"Improved pores detection in fingerprints by applying ring led's", E.J.Busselaar. Optica Applicata, vol. XL, No. 4, 2010.

(Continued)

*Primary Examiner* — Ifedayo B Iluyomade
(74) *Attorney, Agent, or Firm* — H.C. Park & Associates, PLC

(57) ABSTRACT

A touch panel includes a first touch electrode disposed on a base substrate and a second touch electrode disposed on an insulating layer, which is disposed over the first touch electrode. The first touch electrode includes a first linear pattern disposed along a first direction and a first protrusion pattern extending from the first linear pattern. The second touch electrode includes a second linear pattern disposed along a second direction crossing the first direction and a second protrusion pattern extending from the second linear pattern. Wires connect the first touch electrode and the second touch electrode to a driving circuit. The second protrusion pattern partially overlaps the first protrusion pattern.

23 Claims, 8 Drawing Sheets

(56) References Cited

OTHER PUBLICATIONS

"A Highly Area-Efficient Controller for Capacitive Touch Screen Panel Systems", IEEE Trans. Consumer Electron, vol. 56, No. 2, pp. 1115-1122, 2010.

* cited by examiner

TOUCH PANEL AND DISPLAY DEVICE INCLUDING THE SAME

CROSS-REFERENCE TO RELATED APPLICATION

This application claims priority from and the benefit of Korean Patent Application No. 10-2016-0006067 filed on Jan. 18, 2016, which is hereby incorporated by reference for all purposes as if fully set forth herein.

BACKGROUND

Field

Exemplary embodiments relate to a touch panel and a display device including the touch panel.

Discussion of the Background

Touch panels have seen explosive growth in recent years. Touch panels are sensing devices that are provided at a display side of display devices to be use as an input source to an attached or integrated computing device such as a smart phone, tablet, desktop computer, or laptop computer. Touch panels include touch sensor electrodes having a material with high electrical conductivity. However, touch sensor electrodes typically have limited dimension constraints in order to avoid poor touch recognition rates due to resistivity and to visibility.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a display device including the touch panel configured to ensure capacitance and to improve a touch recognition rate of the touch panel as well as be visually transparent to a user.

Additional aspects will be set forth in the detailed description which follows, and, in part, will be apparent from the disclosure, or may be learned by practice of the inventive concept.

An exemplary embodiment includes a touch panel. The touch panel includes a first touch electrode disposed on a base substrate and a second touch electrode disposed on an insulating layer, which is disposed over the first touch electrode. The first touch electrode includes a first linear pattern disposed along a first direction and a first protrusion pattern extending from the first linear pattern. The second touch electrode includes a second linear pattern disposed along a second direction crossing the first direction and a second protrusion pattern extending from the second linear pattern. Wires connect the first touch electrode and the second touch electrode to a driving circuit. The second protrusion pattern partially overlaps the first protrusion pattern.

An exemplary embodiment includes a display device. A display device includes a display panel configured to display an image and a touch panel disposed in a front surface of the display panel. The touch panel includes a first touch electrode disposed on a base substrate and a second touch electrode disposed on an insulating layer, which is disposed over the first touch electrode. The first touch electrode includes a first linear pattern disposed along a first direction and a first protrusion pattern extending from the first linear pattern. The second touch electrode includes a second linear pattern disposed along a second direction crossing the first direction and a second protrusion pattern extending from the second linear pattern. Wires connect the first touch electrode and the second touch electrode to a driving circuit. The second protrusion pattern partially overlaps the first protrusion pattern.

An exemplary embodiment includes a touch panel. The touch panel includes a first touch electrode disposed on a base substrate and a second touch electrode disposed on an insulating layer, which is disposed over the first touch electrode. The first touch electrode includes a first linear pattern disposed along a first direction and a first protrusion pattern extending from the first linear pattern. The second touch electrode includes a second linear pattern disposed along a second direction crossing the first direction and a second protrusion pattern extending from the second linear pattern. Wires connect the first touch electrode and the second touch electrode to a driving circuit. The second protrusion pattern is disposed adjacent to the first protrusion pattern.

According to an exemplary embodiment, it is possible to improve a touch recognition rate of the touch panel by modifying the structure of the touch electrode of the touch panel and inducing a large change of capacitance.

Moreover, an aperture ratio of the display device may be improved by disposing the touch electrode to overlap with the emission area in the display device provided with the above-described touch panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
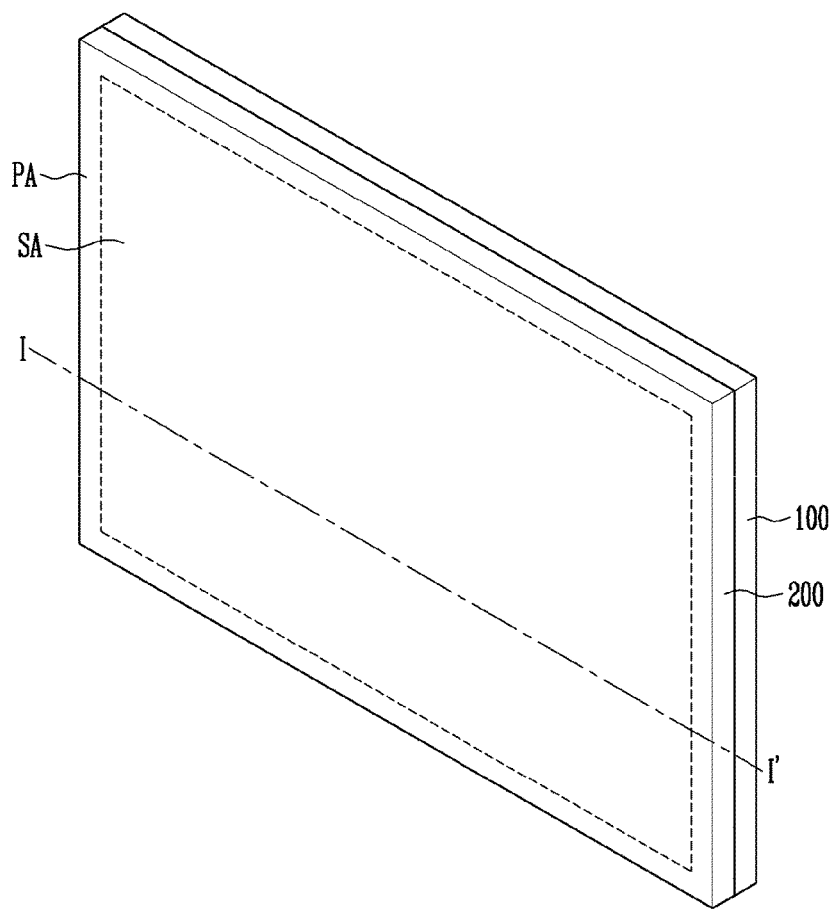
FIG. 1A is a perspective view of a display device including a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Touch panels may be classified into a resistive type, a capacitive type, an electro-magnetic type, etc. In order for these touch panels to be applied to electronics, signal amplification, a resolution difference, design, difficulty of a processing technology, optical characteristics, electrical characteristics, mechanical characteristics, environmental characteristics, input characteristics, durability, economical efficiency, etc., are considered. The resistive type of touch panel and the capacitive type of touch panel are widely used in various fields.

A touch panel may include an indium tin oxide (ITO) as an electrode material of a touch sensor. ITO has relatively good electric conductivity. However ITO limits the design and dimensions of touch panel for a display device. In other words, a touch electrode including ITO must have a minimum width and maximum width. If the width of the touch electrode is too low (i.e., less than a minimum width), the resistivity of the touch electrode increases to an unacceptable level rendering the electrode inoperable. In addition, as the width of the touch electrode decreases and approaches the minimum width, the length of the correspondingly increases, which may result operational errors (e.g., failure to detect a touch input or delayed in touch recognition) for the touch panel. Alternatively, if the width of the touch electrode is too high (i.e., greater than a maximum width), the touch electrode may become visible, which may block or distort an image displayed on the display device In order to overcome the above-mentioned problem, exemplary embodiments include a non-ITO touch sensor electrode material suitable for use in a touch panel of a display device and having less dimension constraints. In addition, exemplary embodiments improve the touch recognition rate of touch sensor electrodes.

Figure 1B:
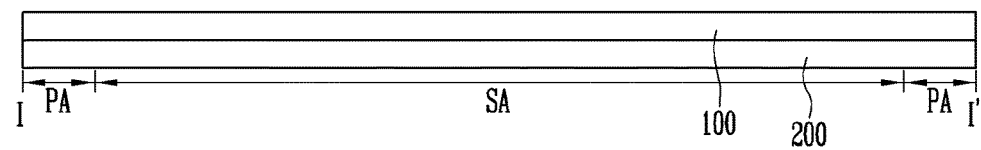
FIG. 1B is a cross-sectional view of the display device of FIG. 1A taken along sectional line I-I'.

FIG. 1A is a perspective view of a display device including a touch panel according to an exemplary embodiment. FIG. 1B is a cross-sectional view of the display device of FIG. 1A taken along sectional line I-I'.

Referring to FIGS. 1A and 1B, a display device may be provided in various shapes, for example, a hexahedron having two pairs of parallel sides. For better understanding and ease of description, the display device represents a rectangular cuboid having a pair of long sides and a pair of short sides according to an exemplary embodiment.

The display device may include a display panel 100. The display panel 100 may display arbitrary visual information such as a text, a video, a photograph, a two-dimensional image, or a three-dimensional image. Hereinafter, the arbitrary visual information is referred to as an "image."

The display panel 100 is not necessarily limited to one that displays an image. For example, the display panel 100 may include an organic electro-luminescence display panel, a liquid crystal panel, an electrophoretic display panel, electro-wetting display panel, and the like.

The display panel 100 may include a display area (not shown) in which an image is displayed, and a non-display area (not shown) disposed at one side of the display area. For example, the non-display area may be provided as a shape surrounding the display area.

The display device may also include a touch panel 200. The touch panel 200 may be disposed on a front surface of the display panel 100. In other words, the touch panel 200 may be disposed on a surface of the display panel 100 that displays an image. Alternatively, the touch panel 200 may be disposed inside the display panel 100 and may be integrally provided with the display panel 100. According to an exemplary embodiment, a case in which the touch panel 200 is disposed on the display panel 100 will be exemplarily described.

The touch panel 200 may include a sensing area SA for sensing a touch event (i.e., when a user contacts the display device with the touch panel 200) and a peripheral area PA disposed at one side of the sensing area SA. For example, the peripheral area PA may be provided as a shape surrounding the sensing area SA.

The display area of the display panel 100 and the sensing area SA may correspond to each other and may be overlap each other. The non-display area of the display panel 100 and the peripheral area PA may correspond to each other and may overlap each other.

Figure 2:
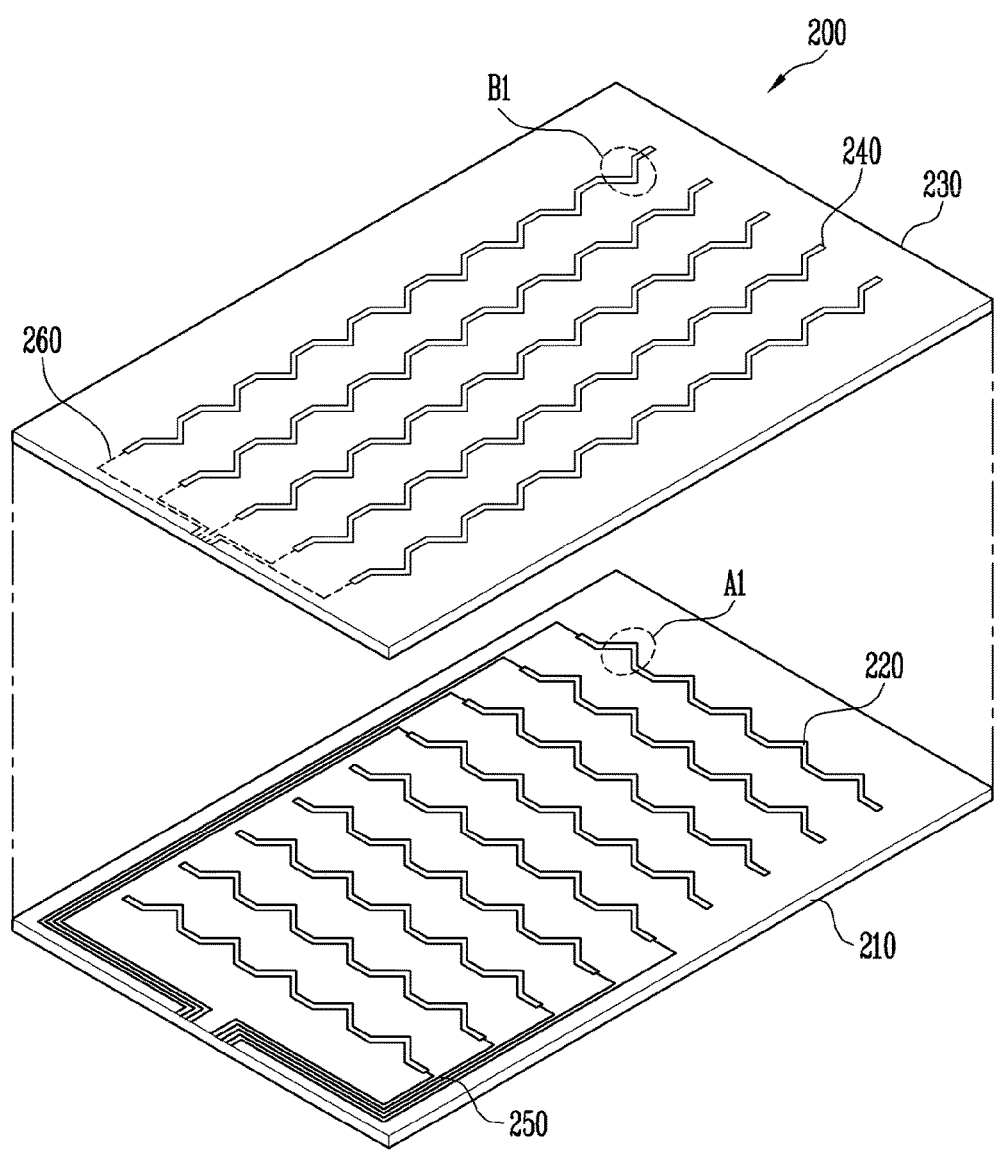
FIG. 2 is an exploded perspective view of a touch panel according to an exemplary embodiment.
Figure 3A:
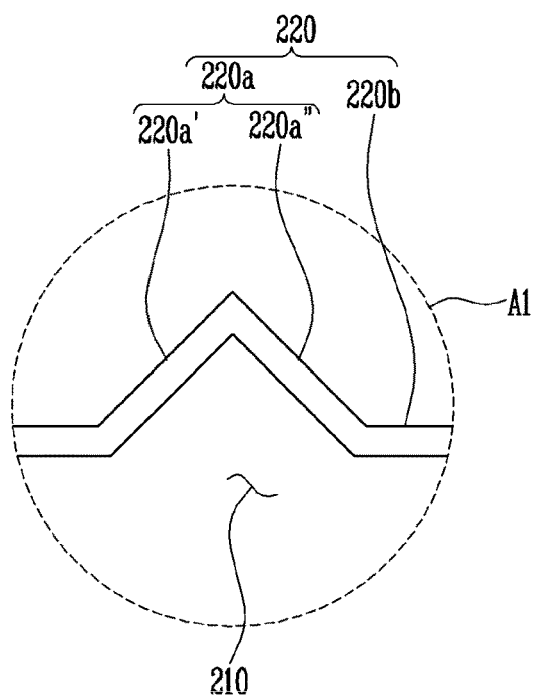
FIG. 3A is an enlarged top plan view of a portion "A1" of the touch panel of FIG. 2.
Figure 3B:
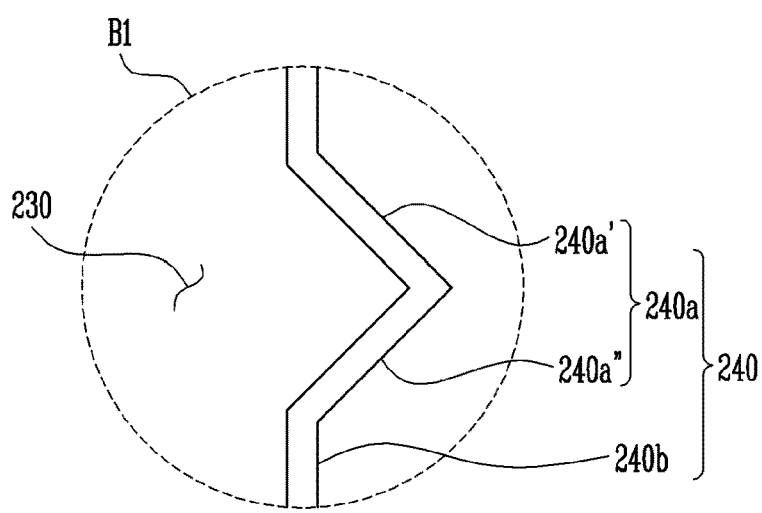
FIG. 3B is an enlarged top plan view of a portion "B1" of the touch panel of FIG. 2.

FIG. 2 is a schematic exploded perspective view of a touch panel according to an exemplary embodiment. FIG. 3A is a schematic enlarged top plan view of a portion "A1" of the touch panel of FIG. 2 according to an exemplary embodiment. FIG. 3B is a schematic enlarged top plan view of a portion "B1" of the touch panel of FIG. 2 according to an exemplary embodiment.

Referring to FIGS. 2, 3A, and 3B, the touch panel 200 may include a touch sensor disposed in the sensing area (SA of FIG. 1A) and a wire part disposed in the peripheral area (PA of FIG. 1A).

The touch sensor may recognize a user's finger or a stylus pen contacting the display device as a touch event for the display device. The touch sensor may be a capacitance type touch sensor.

The touch sensor may include a plurality of first touch electrodes 220 that extends in a first direction (e.g., a horizontal direction) and a plurality of second touch electrodes 240 extending in a second direction that is different than the first direction (e.g., a vertical direction). For example, the first direction may be perpendicular to the second direction. A sensing voltage may be applied to the plurality of first touch electrodes 220. The plurality of first touch electrodes 220 may be capacitance-connected with the plurality of second touch electrodes 240, and a voltage may be changed by the capacitance-connection between the plurality of first touch electrodes 220 and the plurality of second touch electrodes 240.

A first touch electrode 220 may include a first linear pattern 220b disposed along the first direction and a first protrusion pattern 220a having a protruded shape and being connected to the first linear pattern 220b. For example, the first protrusion pattern 220a may have a triangular shape.

Here, the first protrusion pattern 220a may include a first inclined pattern 220a' extending from the first linear pattern 220b and disposed along a third direction crossing the first direction. The third direction may be oblique to the first direction. The first protrusion pattern 220a may also include a second inclined pattern 220a" extending from the first inclined pattern 220a' and disposed along a fourth direction crossing the third direction of the first inclined pattern 220a'. The fourth direction may be perpendicular to the third direction and may be oblique to the first direction. The first inclined pattern 220a', the second inclined pattern 220a", and the first linear pattern 220b may be linear.

A second touch electrode 240 may include a second linear pattern 240b disposed along the second direction and a second protrusion pattern 240a having a protruded shape that is connected to the second linear pattern 240b. For example, the second protrusion pattern 240a may have a triangular shape.

Here, the second protrusion pattern 240a may include a third inclined pattern 240a' extending from the second linear pattern 240b and disposed along a fifth direction crossing the second direction. The fifth direction may be oblique to the second direction. The second protrusion patter 204a may include a fourth inclined pattern 240a" extending from the third inclined pattern 240a' and disposed along a sixth direction crossing the fifth direction of the third inclined pattern 240a'. The sixth direction may be perpendicular to the fifth direction and may be oblique to the second direction. In addition, the fifth direction may be parallel to the third direction and the sixth direction may be parallel to the fourth direction. In other words, the fifth direction may be the same as or opposite of the third direction and the sixth direction may be the same as or opposite of the fourth direction. The third inclined pattern 240a', the fourth inclined pattern 240a", and the second linear pattern 240b may be linear.

The plurality of first touch electrodes 220 may be disposed on a base substrate 210. The plurality of second touch electrodes 240 may be disposed on an insulating layer 230, which is disposed over the base substrate 210.

The insulating layer 230 may be disposed between the plurality of first touch electrodes 220 and the plurality of second touch electrodes 240. The insulating layer 230 may include an insulating material for insulating the first touch electrodes 220 and the second touch electrodes 240.

Further, the insulating layer 230 may include a dielectric material for generating capacitance between the plurality of first touch electrodes 220 and the plurality of second touch electrodes 240. For example, the insulating layer 230 may include an aluminum oxide ($Al_2O_3$) layer.

The wire part connects the touch sensor to a driving circuit (not shown) for driving the touch panel 200. The driving circuit may be provided from the external, and may include a position detecting circuit. The wire part may transmit a sensing input signal from the driving circuit to the plurality of first touch electrodes 220 and the plurality of second touch electrodes 240, or may transmit a sensing output signal outputted from the plurality of first touch electrodes 220 and the plurality of second touch electrodes 240 to the driving circuit.

The touch panel may include a wire part that includes a plurality of first sensing lines 250 connected to the plurality of first touch electrodes 220 and a plurality of second sensing lines 260 connected to the plurality of second touch electrodes 240.

Hereinafter, a connection relationship between the plurality of first touch electrodes 220 and the plurality of second touch electrode 240 and a stacking structure between the first touch electrode 220 and the second touch electrode 240 will be described with reference to FIGS. 4, 5A, and 5B.

Figure 4:
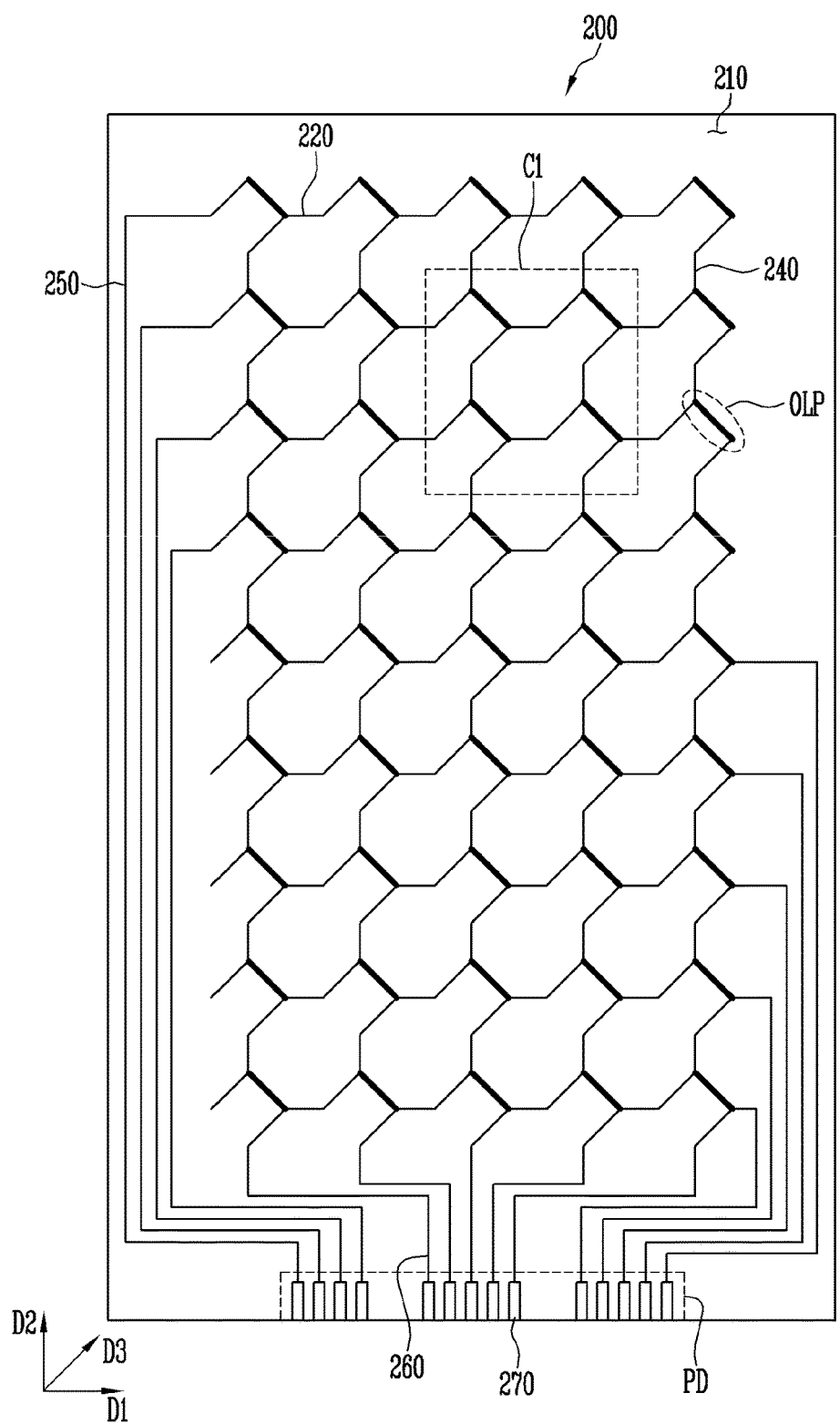
FIG. 4 is a top plan view of the touch panel of FIG. 2 according to an exemplary embodiment.

FIG. 4 is a top plan view of the touch panel of FIG. 2 according to an exemplary embodiment. FIG. 5A is a schematic enlarged top plan view of a portion "C1" of the touch panel of FIG. 4. FIG. 5B is a cross-sectional view of the touch panel of FIG. 5A taken along sectional line II-II'.

Figure 5A:
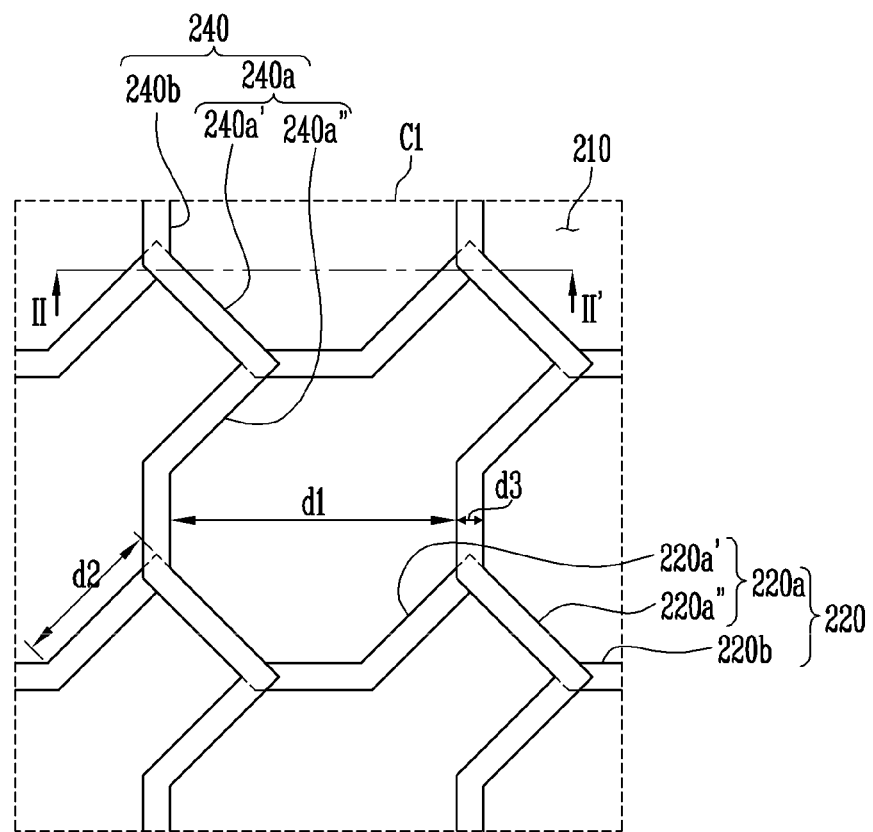
FIG. 5A is an enlarged top plan view of a portion "C1" of the touch panel of FIG. 4.
Figure 5B:
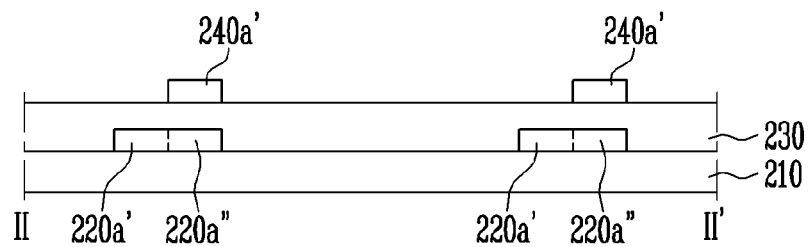
FIG. 5B is a cross-sectional view of the touch panel of FIG. 5A taken along sectional line II-II'.

Referring to FIGS. 4, 5A, and 5B, the touch panel 200 may include the plurality of first touch electrodes 220, the plurality of second touch electrodes 240, the plurality of first sensing lines 250, the plurality of second sensing lines 260, and a pad PD, which are disposed on the base substrate 210.

The pad PD may be configured to connect the plurality of first sensing lines 250 and the plurality of second sensing lines 260 to the driving circuit. The pad PD may be disposed at one side of the peripheral area (PA of FIG. 1A). The plurality of first sensing lines 250 and the plurality of second sensing lines 260 may be connected to the driving circuit by a connector provided at the pad PD or a non-conductive adhesive film.

The base substrate 210 may have a quadrangular shape (e.g., a rectangular cuboid) and may include a transparent insulating material.

The plurality of first touch electrodes 220 and the plurality of first sensing lines 250 connected to the plurality of first touch electrodes 220 may be disposed on the base substrate 210.

The plurality of first touch electrodes 220 and the plurality of first sensing lines 250 may include an opaque conductive material such as a metal. For example, the plurality of first touch electrodes 220 and the plurality of first sensing lines 250 may include a low resistance metal. The low resistance metal may include at least one of gold, silver, and aluminum. For example, the low resistance metal may be an alloy of gold, silver, and or aluminum.

The plurality of first touch electrodes 220 may extend along the first direction D1 on the base substrate 210. Each of the plurality of first touch electrodes 220 may include the first linear pattern 220b disposed along the first direction D1 and the first protrusion pattern 220a connected to the first linear pattern 220b. Here, a thickness of the first linear pattern 220b and a thickness of the first protrusion pattern 220a may be the same. However, exemplary embodiments are not limited to the thickness of the first linear pattern 220b and the first protrusion pattern 220a being equal.

The first protrusion pattern 220a may include the first inclined pattern 220a' extending from the first linear pattern 220b and the second inclined pattern 220a" extending from the first inclined pattern 220a'. Here, a length d2 of the first inclined pattern 220a' may be about 1 µm to 100 µm. For example, the length d2 of the first inclined pattern may be about 1 µm to 72 µm, 18 µm to 54 µm, 27 µm to 45 µm, or 31 µm to 41 µm. As a further example, the length d2 of the first inclined pattern may be about 36 µm. Further, the length of the second inclined pattern 220a", the third inclined pattern 240a', and the fourth inclined pattern 240a" may be equal to the length d2 of the second linear pattern 220a. However, exemplary embodiments are not limited to having a length of the first inclined pattern 220a' equal to 1 to 200 µm nor are exemplary embodiments limited to having the length of the second inclined pattern 220a" equal to the first inclined pattern 220a'.

The first inclined pattern 220a' may be disposed along a third direction crossing the first direction D1 on the base substrate 210. The second inclined pattern 220a" may be disposed along a fourth direction crossing the third direction of the first inclined pattern 220a'.

A first side of each of the plurality of first sensing lines 250 may be connected to the plurality of first touch electrodes 220, and a second side of each of the plurality of first sensing lines 250 may be connected to terminals 270 of the pad PD. The plurality of first sensing lines 250 may be disposed in the peripheral area (PA of FIG. 1A).

The insulating layer 230 may be disposed on the plurality of first touch electrodes 220 and the plurality of first sensing lines 250.

The plurality of second touch electrodes 240 and the plurality of second sensing lines 260 connected to the plurality of second touch electrodes 240 may be disposed on the insulating layer 230.

The plurality of second touch electrodes 240 and the plurality of second sensing lines 260 may include an opaque conductive material. For example, the opaque conductive material may be a metal. Specifically, the plurality of second touch electrodes 240 and the plurality of second sensing lines 260 may include a low resistance metal. The low resistant metal may include at least one of gold, silver, and aluminum. For example, the low resistance metal may be an alloy of gold, silver, and or aluminum.

The plurality of second touch electrodes 240 may extend along the second direction D2 crossing the first direction D1. For instance, the second direction D2 may be perpendicular to the first direction D1. Each of the plurality of second touch electrodes 240 may include the second linear pattern 240b disposed along the second direction D2 and the second protrusion pattern 240a connected to the second linear pattern 240b. Here, a thickness of the second linear pattern 240b and a thickness of the second protrusion pattern 240a may be equal. Further, a thickness of the plurality of second touch electrodes 240 and a thickness of the plurality of first touch electrodes 220 may be equal. However, exemplary embodiments are not limited to having thicknesses of the second linear 240b and the second protrusion pattern 240a being equal and instead may have different thicknesses. Similarly, exemplary embodiments are not limited to having thicknesses of the plurality of second touch electrodes 240 and the plurality of first touch electrodes being equal and instead may have different thicknesses.

The second protrusion pattern 240a may include the third inclined pattern 240a' extending from the second linear pattern 240b and disposed along a fifth direction crossing the second direction D2. The second protrusion pattern 240a may include the fourth inclined pattern 240a" extending from the third inclined pattern 240a' and disposed along a sixth direction crossing the fifth direction of the third inclined pattern 240a'.

A distance d1 between one second linear pattern 240b and an adjacent second linear pattern 240b may be about 10 µm to 180 µm. For example, the distance d1 between one second linear pattern 240b and an adjacent second linear pattern 240b may be 40 µm to 120 µm, 50 µm to 110 µm, 60 µm to 100 µm, or 70 µm to 90 µm. As another example, the distance d1 between one second linear pattern 240b and an adjacent second linear pattern 240b may be about 80 µm. A thickness d3 of the second linear pattern 240b may be about 1 µm to 10 µm. For example, the thickness d3 of the second linear pattern 240b may be about 1 µm, 2 µm, 3 µm, 4 µm, 5 µm, 6 µm, 7 µm, 8 µm, 9 µm or 10 µm. However, exemplary embodiments are not limited a distance d1 equal to 40 µm to 120 µm and a thickness d3 equal to 1 µm to 10 µm.

In an exemplary embodiment, the thicknesses of the third inclined pattern 240a', the fourth inclined pattern 240a", the first linear pattern 220b, the first inclined pattern 220a', and the second inclined pattern 220a" may be equal to the thickness d3 of the second linear pattern 240b.

The plurality of first touch electrodes 220 and the plurality of second touch electrodes 240 may be disposed on the base substrate 210 to partially overlap each other. The insulating layer 230 may be disposed between the plurality of first touch electrodes 220 and the plurality of second touch electrodes 240. For example, the second inclined pattern 220a" of the plurality of first touch electrodes 220 and the third inclined pattern 240a' of the plurality of second touch electrodes 240 may overlap each other. An overlap region (OLP) where the second inclined pattern 220a" of the plurality of first touch electrodes 220 and the third inclined pattern 240a' of the plurality of second touch electrodes 240 overlap each other may be shown as one pattern in a top plan view. As the overlap region OLP increases, a capacitance generated between the first touch electrode 220 and the second touch electrode 240 may increase. Therefore, touch panels 200 according to various exemplary embodiments have large changes in capacitance when a user's finger or other electrically conductive material (e.g., a stylus pen) approaches the touch panel 200. Accordingly, touch panels 200 according to various exemplary embodiments have an improved touch recognition rate of the touch panel compared to conventional touch panels.

Figure 6:
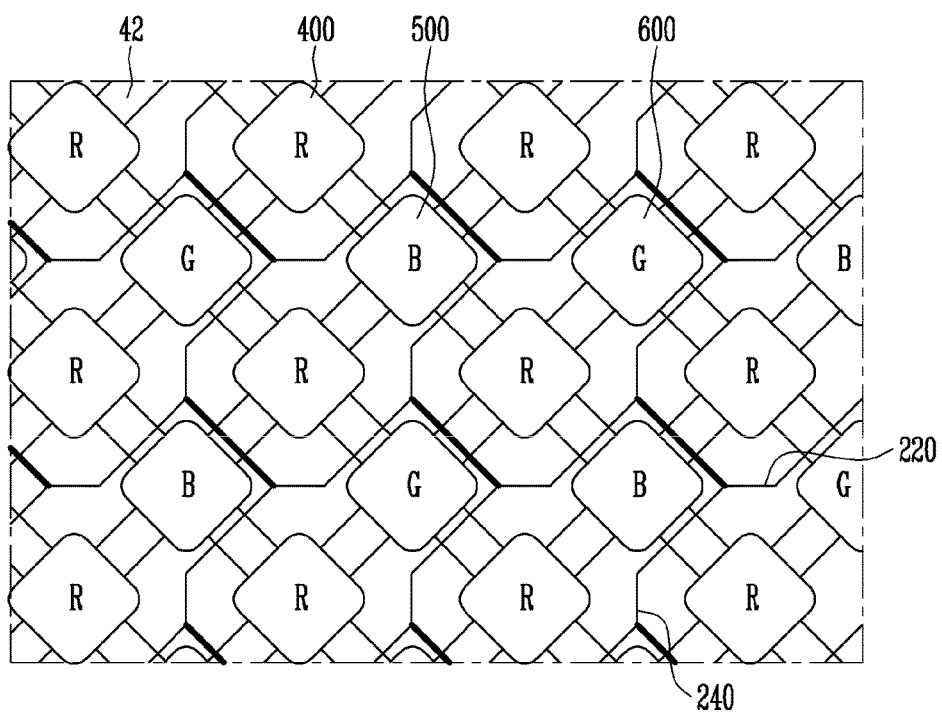
FIG. 6 is a top plan view of a portion of a display panel including the touch panel of FIG. 4 according to an exemplary embodiment.

FIG. 6 is a top plan view of a portion of a display panel including the touch panel of FIG. 4 according to an exemplary embodiment.

Referring to FIGS. 4 and 6, the display panel may include a plurality of first pixels 400, a plurality of second pixels 500, and a plurality of third pixels 600. For better understanding and ease of description, the plurality of first pixels 400, the plurality of second pixels 500, and the plurality of third pixels 600 are shown to have the same area. However, exemplary embodiments are not limited to the plurality of first pixels 400, the plurality of second pixels 500, and the plurality of third pixels 600 are shown to having the same area. Similarly, shapes of the plurality of pixels 400, 500, and 600 are not limited to those shown in the drawings. For example, the plurality of pixels 400, 500, and 600 may have various shapes. For example, the plurality of pixels 400, 500, and 600 may have a non-polygonal shape such as a circular or oval shape, or a polygonal shape, such as a triangular, a quadrilateral, pentagonal, hexagonal, heptagonal, or octagonal shape.

Each of the plurality of first pixels 400 may include a first emission area (R) emitting red light, each of the plurality of second pixels 500 may include a second emission area (B) emitting blue light, and each of the plurality of third pixels 600 may include a third emission area (G) emitting green light. Other elements 42 (e.g., a pixel defining layer) may be disposed between the plurality of first pixels 400, the plurality of second pixels 500, and the plurality of third pixels 600.

The touch panel 200 may include a plurality of first touch electrodes 220 and a plurality of second touch electrodes 240 that are not overlapped with the emission areas R, B, and G of the display panel 100. However, the plurality of second touch electrodes 240 may partially overlap the plurality of first touch electrodes 220. Since the plurality of first touch electrodes 220 and the plurality of second touch electrodes 240 may include an opaque conductive material and are not overlapped with the emission areas R, G, and B of the display panel, an aperture ratio of the display panel may be improved, thereby increasing light transmittance when compared to a display device with touch electrodes that include opaque conductive material and that overlap emission areas. Since change of the capacitance generated between the first touch electrode 220 and the second touch electrode 240 is greatly induced due to the overlapped area between the plurality of first touch electrodes 220 and the plurality of second touch electrodes 240, the touch recognition rate may be improved when compared to a convention display device without an overlap area.

Figure 7:
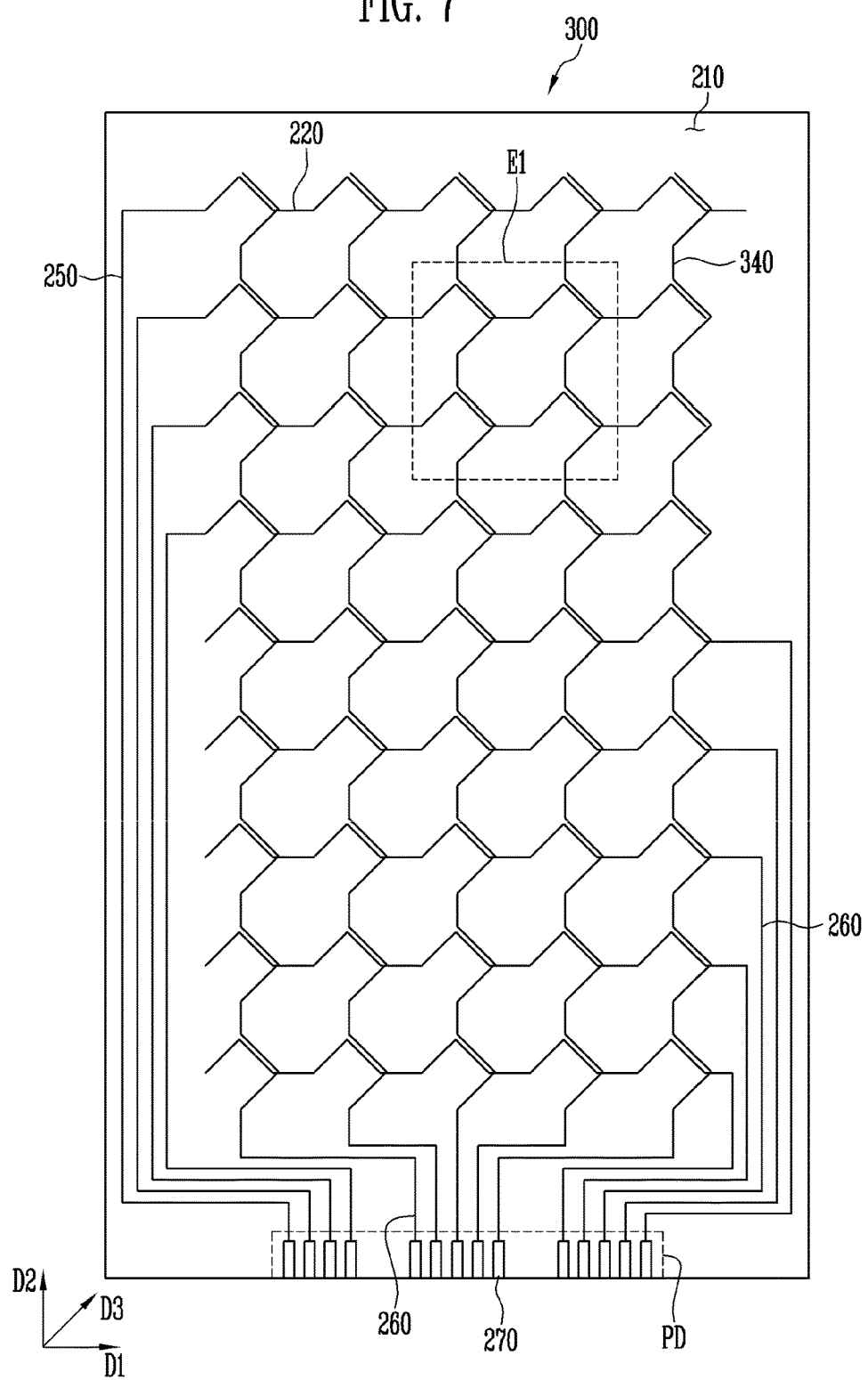
FIG. 7 is a top plan view of a touch panel according to an exemplary embodiment.
Figure 8A:
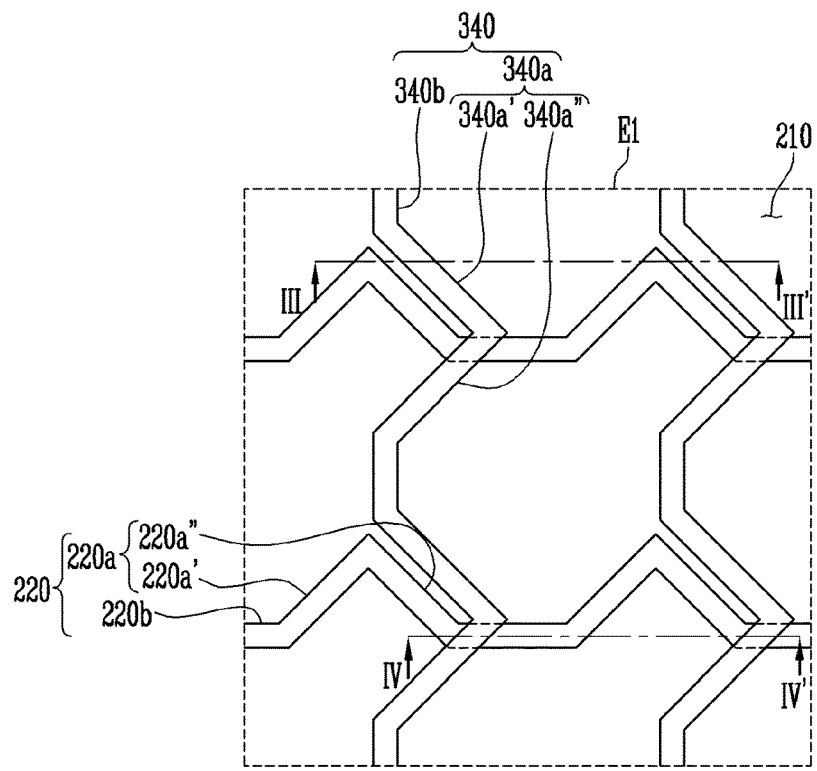
FIG. 8A is an enlarged top plan view of a portion "E1" of the touch panel of FIG. 7.
Figure 8B:
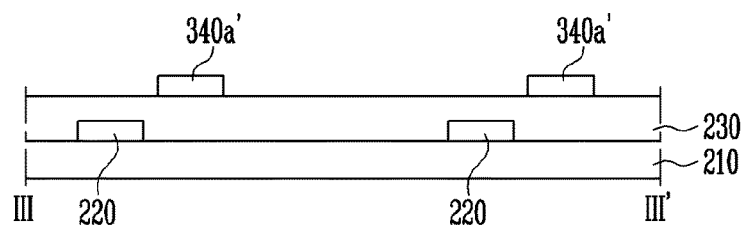
FIG. 8B is a cross-sectional view of the touch panel of FIG. 8A taken along sectional line III-III'.
Figure 8C:
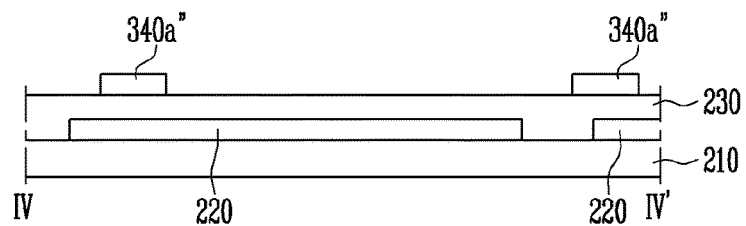
FIG. 8C is a cross-sectional view of the touch panel of FIG. 8A taken along sectional line IV-IV'.

FIG. 7 is a top plan view of a touch panel according to an exemplary embodiment. FIG. 8A is an enlarged top plan view of a portion "E1" of the touch panel of FIG. 7. FIG. 8B is a cross-sectional view of the touch panel of FIG. 8A taken along sectional line. FIG. 8C is a cross-sectional view of the touch panel of FIG. 8A taken along sectional line IV-IV'.

Referring to FIGS. 7, 8A, 8B and 8C, a touch panel 300 may include a plurality of first touch electrodes 220, a plurality of second touch electrodes 340, a plurality of first sensing lines 250, a plurality of second sensing lines 260, and a pad PD, which are disposed on the base substrate 210.

The plurality of first touch electrodes 220 may extend along the first direction D1 on the base substrate 210. Each of the plurality of first touch electrodes 220 may include a first linear pattern 220b disposed along a first direction D1 and a first protrusion pattern 220a connected to the first linear pattern 220b.

The first protrusion pattern 220a may include a first inclined pattern 220a' extending from the first linear pattern 220b and disposed along a third direction crossing the first direction D1. The first protrusion pattern 220a may include a second inclined pattern 220a" extending from the first inclined pattern 220a' and disposed along a fourth direction crossing the third direction of the first inclined pattern 220a'.

The plurality of second touch electrodes 340 may be disposed on the plurality of first touch electrodes 220 with the insulating layer 230 between the plurality of second touch electrodes 340 and the plurality of first touch electrodes 220. The plurality of second touch electrodes 340 may extend along a second direction D2 crossing the first direction D1. Each of the plurality of second touch electrodes 340 may include a second linear pattern 340b disposed along the second direction D2 and a second protrusion pattern 340a connected to the second linear pattern 340b.

The second protrusion pattern 340a may include a third inclined pattern 340a' extending from the second linear pattern 340b and disposed along a fifth direction crossing the second direction D2. The second protrusion pattern 340a may include a fourth inclined pattern 340a" extending from the third inclined pattern 340a' and disposed along a sixth direction crossing the fifth direction of the third inclined pattern 340a'.

Capacitance may be generated at intersections of the plurality of first touch electrodes 220 and the plurality of second touch electrodes 340. The intersections may be defined as areas where the first linear pattern 220b of the plurality of first touch electrodes 220 and the fourth inclined pattern 340a" of the plurality of second touch electrodes 340 overlap each other.

When a user's finger or a stylus pen approaches the touch panel 300, a change of the capacitance may occur at the intersections. A driving circuit (not shown) connected to the plurality of first touch electrodes 220 and the plurality of second touch electrodes 340 may check the change of the capacitance and may calculate a touch position based on the change of the capacitance.

The first protrusion pattern 220a of the plurality of first touch electrodes 220 and the second protrusion pattern 340a of the plurality of second touch electrodes 340 may be disposed to be maximally adjacent to each other. As the plurality of first touch electrodes 220 and the plurality of second touch electrodes 340 are disposed close to one another, parasitic capacitance may occur between the plurality of first touch electrodes 220 and the plurality of second touch electrodes 340. A large change in parasitic capacitance may be occur between the plurality of first touch electrodes 220 and the plurality of second touch electrodes 340 when a user's finger or a stylus pen approaches the touch panel 300. Accordingly, the touch recognition rate of the touch panel 300 may be improved when compared to conventional touch panels.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
a first touch electrode disposed on a base substrate, and the first touch electrode comprising a first linear pattern disposed along a first direction and a first protrusion pattern extending from the first linear pattern;
a second touch electrode disposed on an insulating layer, which is disposed over the first touch electrode, and the second touch electrode comprising a second linear pattern disposed along a second direction crossing the first direction and a second protrusion pattern extending from the second linear pattern; and
wires connecting the first touch electrode and the second touch electrode to a driving circuit,
wherein a portion of the second protrusion pattern overlaps and is parallel to a portion of the first protrusion pattern, and
wherein the first linear pattern and the second linear pattern extend in different directions without overlapping each other.

2. The touch panel of claim 1, wherein
the first protrusion pattern comprises a first inclined pattern extending from the first linear pattern and disposed along a third direction crossing the first direction, and a second inclined pattern extending from the first inclined pattern and disposed along a fourth direction crossing the third direction, and
the second protrusion pattern comprises a third inclined pattern extending from the second linear pattern and disposed along a fifth direction crossing the second direction, and a fourth inclined pattern extending from the third inclined pattern and disposed along a sixth direction crossing the fifth direction.

3. The touch panel of claim 2, wherein:
the portion of the second protrusion pattern is one of the third inclined pattern and the fourth inclined pattern, and
the portion of the first protrusion pattern is one of the first inclined pattern and the second inclined pattern.

4. The touch panel of claim 2, wherein:
the portion of the first protrusion pattern is the second inclined pattern, and
the portion of the second protrusion pattern is the third inclined pattern.

5. The touch panel of claim 1, wherein the wires comprise:
a first sensing wire disposed on the base substrate and connected to the first touch electrode; and
a second sensing wire disposed on the insulating layer and connected to the second touch electrode.

6. The touch panel of claim 1, wherein
the first touch electrode and the second touch electrode comprise an opaque conductive material.

7. The touch panel of claim 2, wherein
the first inclined pattern, the second inclined pattern, the third inclined pattern and the fourth inclined pattern are linear.

8. The touch panel of claim 7, wherein:
the first, second, third, and fourth inclined patterns have lengths of about 1 µm to 100 µm and thicknesses of about 1 µm to 10 µm,
the first and second linear patterns have thicknesses of about 1 µm to 10 µm.

9. A display device, comprising:
a display panel comprises a plurality of pixels having an emission area and configured to display an image; and
a touch panel disposed in a front surface of the display panel,
wherein the touch panel comprises:
a first touch electrode disposed on a base substrate, and the first touch electrode comprising a first linear pattern disposed along a first direction and a first protrusion pattern extending from the first linear pattern;
an insulating layer disposed on the first touch electrode and the base substrate;
a second touch electrode disposed on the insulating layer, and the second touch electrode comprising a second linear pattern disposed along a second direction crossing the first direction and a second protrusion pattern extending from the second linear pattern; and
wires connecting the first touch electrode and the second touch electrode to a driving circuit,
wherein a portion of the second protrusion pattern overlaps and is parallel to a portion of the first protrusion pattern, and
wherein the first linear pattern and the second linear pattern extend in different directions without overlapping each other.

10. The display device of claim 9, wherein
the first protrusion pattern comprises a first inclined pattern extending from the first linear pattern and disposed along a third direction crossing the first direction, and a second inclined pattern extending from the first inclined pattern and disposed along a fourth direction crossing the third direction, and
the second protrusion pattern comprises a third inclined pattern extending from the second linear pattern and disposed along a fifth direction crossing the second direction, and a fourth inclined pattern extending from the third inclined pattern and disposed along a sixth direction crossing the fifth direction.

11. The display device of claim 10, wherein:
the portion of the second protrusion pattern is one of the third inclined pattern and the fourth inclined pattern, and
the portion of the first protrusion pattern is one of the first inclined pattern and the second inclined pattern.

12. The display device of claim 10, wherein:
the portion of the first protrusion pattern is the second inclined pattern, and
the portion of the second protrusion pattern is the third inclined pattern.

13. The display device of claim 9, wherein
the first protrusion pattern and the second protrusion pattern comprise a plurality of linear patterns.

14. The display device of claim 9, wherein the wires comprise:
a first sensing wire disposed on the base substrate and is connected to the first touch electrode; and
a second sensing wire disposed on the insulating layer and is connected to the second touch electrode.

15. The display device of claim 9, wherein
the first touch electrode and the second touch electrode comprise an opaque conductive material.

16. The display device of claim 9, wherein
the display panel comprises a plurality of pixels having an emission area that does not overlap the first touch electrode or the second touch electrode.

17. A touch panel, comprising:
a first touch electrode disposed on a base substrate, and the first touch electrode comprising a first linear pattern disposed along a first direction and a first protrusion pattern extending from the first linear pattern;
a second touch electrode disposed on an insulating layer, which is disposed over the first touch electrode, and the second touch electrode comprising a second linear pattern disposed along a second direction crossing the first direction and a second protrusion pattern extending from the second linear pattern; and
wires connecting the first touch electrode and the second touch electrode to a driving circuit,
wherein a portion of the second protrusion pattern is disposed adjacent to and is parallel to a portion of the first protrusion pattern, and
wherein the first linear pattern and the second linear pattern extend in different directions without overlapping each other.

18. The touch panel of claim 17, wherein:
the first protrusion pattern comprises a first inclined pattern extending from the first linear pattern and disposed along a third direction crossing the first direction, and a second inclined pattern extending from the first inclined pattern and disposed along a fourth direction crossing the third direction, and
the second protrusion pattern comprises a third inclined pattern extending from the second linear pattern and disposed along a fifth direction crossing the second direction, and a fourth inclined pattern extending from the third inclined pattern and disposed along a sixth direction crossing the fifth direction.

19. The touch panel of claim 18, wherein:
the fourth inclined pattern partially overlaps the first linear pattern,
the portion of the second protrusion pattern is the third inclined pattern, and
the portion of the first protrusion pattern is the second inclined pattern.

20. The touch panel of claim 18, wherein:
the second linear pattern partially overlaps the first inclined pattern,
the portion of the second protrusion pattern is the third inclined pattern, and
the portion of the first protrusion pattern is the second inclined pattern.

21. The touch panel of claim 1, wherein:
a thickness of the first linear pattern and a thickness of the first protrusion pattern are equal; and
a thickness of the second linear pattern and a thickness of the second protrusion pattern are equal.

22. The display device of claim 9, wherein:
a thickness of the first linear pattern and a thickness of the first protrusion pattern are equal; and
a thickness of the second linear pattern and a thickness of the second protrusion pattern are equal.

23. The touch panel of claim 17, wherein:
a thickness of the first linear pattern and a thickness of the first protrusion pattern are equal; and
a thickness of the second linear pattern and a thickness of the second protrusion pattern are equal.

* * * * *